United States Patent [19]

Schwenninger

[11] Patent Number: 4,874,313
[45] Date of Patent: Oct. 17, 1989

[54] REFRACTORY CLAD LID FOR HEATING VESSEL

[75] Inventor: Ronald L. Schwenninger, Ridgeley, W. Va.

[73] Assignee: PPG Industries, Inc., Pittsburgh, Pa.

[21] Appl. No.: 248,678

[22] Filed: Sep. 26, 1988

[51] Int. Cl.⁴ .............................................. F27D 1/00
[52] U.S. Cl. ................................. 432/247; 432/252; 110/180
[58] Field of Search ............... 432/250, 247, 248, 251, 432/252; 110/180, 339

[56] References Cited

U.S. PATENT DOCUMENTS

| | | |
|---|---|---|
| 1,109,553 | 9/1914 | Slick . |
| 1,686,386 | 10/1928 | Loftus ................... 432/252 |
| 1,794,706 | 3/1931 | Moe et al. . |
| 1,992,465 | 2/1935 | Blagg . |
| 2,024,595 | 12/1935 | Petit ...................... 432/247 |
| 2,319,065 | 5/1943 | Karmanocky ......... 432/252 |
| 2,699,740 | 1/1955 | Weber . |
| 2,753,711 | 7/1956 | Weber . |
| 3,214,154 | 10/1965 | Olsson ................... 110/180 |
| 3,429,973 | 2/1969 | Carter et al. . |
| 4,003,696 | 1/1977 | Rolla ...................... 432/252 |
| 4,021,603 | 5/1977 | Nanjyo et al. . |
| 4,197,422 | 4/1980 | Fuchs et al. . |
| 4,381,934 | 5/1983 | Kunkle et al. . |
| 4,424,756 | 1/1984 | Merkle . |
| 4,434,495 | 2/1984 | Tomizawa et al. . |
| 4,463,689 | 8/1984 | James ..................... 432/247 |
| 4,475,470 | 10/1984 | Merkle . |
| 4,516,935 | 5/1985 | Sanders .................. 432/247 |
| 4,570,550 | 2/1986 | Wilt ........................ 110/180 |
| 4,662,526 | 5/1987 | Schaller ................. 110/180 |
| 4,668,272 | 5/1987 | Newcamp et al. . |
| 4,704,155 | 11/1987 | Matesa et al. . |
| 4,734,551 | 3/1988 | Cheek .................... 432/250 |

Primary Examiner—Henry C. Yuen
Attorney, Agent, or Firm—Andrew C. Siminerio

[57] ABSTRACT

A refractory clad lid for heating vessel is disclosed. The lid includes a plurality of refractory blocks supported from a hollow metal paney by an interlocking dovetailed joint configuration at the panel/block interface. Coolant is circulated through the panel to control lid temperature and reduce block water.

4 Claims, 2 Drawing Sheets

REFRACTORY CLAD LID FOR HEATING VESSEL

BACKGROUND OF THE INVENTION

1. Field of the Invention

This invention relates to a high temperature heating vessel and in particular, to a refractory clad, cooled metal lid for a glass melting furnace.

2. Technical Considerations

Advances in glass melting technology have resulted in new furnace designs in which batch material is liquefied in large volumes in a relatively small liquefaction vessel, for example as disclosed in U.S. Pat. No. 4,381,934 to Kunkel and Matesa. This type of process, particularly when using intensified heat sources, produces relative small volumes of high temperature exhaust gas. The heat from this exhaust gas may be recovered and used to directly heat a batch stream of material feeding the liquefaction vessel so as to improve the overall efficiency of the process.

In a glass batch melting process as taught in U.S. Pat. No. 4,381,934 the heating process may cause portions of the batch material being heated to vaporize. These vapors are corrosive and combine with high temperature exhaust gas from the heating burners that circulates throughout the vessel to form a high temperature corrosive gas that corrodes exposed inner surfaces of the vessel. The corrosion may be accelerated by the high temperature environment within the heating vessel. Particulate materials entrained in the exhaust gas as a result of the liquefaction process have an abrasive action on the exposed surfaces to further reduce the operating life of such a member.

Due to the corrosive affects of the exhaust gas stream within the vessel which are accelerated by the high temperature, as well as any abrasive or erosive affects of the entrained particulates, exposed surfaces within the vessel must be designed to withstand these deleterious conditions so as to reduce maintenance and/or replacement that is necessitated by excessive wear. Massive cooling of the exposed surface to reduce surface temperature may reduce surface wear, but at the same time it has the undesirable affect of reducing the thermal efficiency of the overall melting system by removing heat from the system.

It would be advantageous to have an insulating, wear resistant surface design that can withstand such operating conditions and provide a prolonged operating life while maintaining the thermal efficiency of the system.

2. Patents of Interests

U.S. Pat. No. 1,109,553 to Slick teaches furnace construction wherein refractory bricks are carried by hollow, water cooled girders extending up between and separating the upper parts of the rows of brick. The girders span the width of the furnace and include enlarged shoulder portions that are received by corresponding recesses in the bricks. The bricks can be formed to support additional bricks not directly supported by the girders.

U.S. Pat. No. 1,794,706 to Moe et al. teaches a water cooled furnace arch wherein upper flanges of an upper layer of block are hung on the flanges of supplemental beams, while the upper flanges of a lower set of blocks are hung on and are supported by the lower flanges of the upper blocks. The shoulders of the lower blocks are cut down so as to form longitudinal air channels extending through the arch to receive water pipes that are used to cool the arch.

U.S. Pat. No. 1,992,465 to Blagg teaches a cooled electric furnace roof having frame-like cooling units, wherein adjacent frames include extending flanges along the lower portion of the cooling units to support a refractory member positioned therebetween.

U.S. Pat. Nos. 2,699,740 to H. W. Webber and 2,753,711 to H. G. Webber each teach suspended roof construction wherein a plurality of bricks are interconnected to and supported by a carrier which in turn is supported by an overhead frame. In the former patent, the carrier is a specially shaped, wide flange section. The upper flange wraps around the lower flange of an overhead frame and its lower flange supports a pair of bricks that are interconnected with other bricks to form the roof structure. In the latter patent, the upper section of a carrier brick is supported by a hanger beam while its flared lower section supports a set of interlocking bricks.

U.S. Pat. No. 3,214,154 to Olsson teaches a roof door structure for opening and closing an entrance to a furnace. Roof sections of the structure include cooling pipes embedded within a refractory layer. The cooling pipes have studs which support the refractory layer.

U.S. Pat. No. 3,429,973 to Carter et al. teaches a water cooled roof structure for furnaces with a refractory lining secured to the lower face of a hollow metal cooling structure.

U.S. Pat. No. 4,021,603 to Nanjyo teaches a roof assembly for an arc furnace. Sectionalized roof units include a cast iron main body and a cooling coil embedded within the main body of the panel. The surface of the panel exposed to high temperature may be partially lined with fire brick or other refractory material.

U.S. Pat. No. 4,197,422 to Fuches et al. teaches a water cooled furnace cover with a protective layer of refractory material disposed on the underside of cooling boxes in the furnace cover.

U.S. Pat. No. 4,434,495 to Tomizawa et al. teaches a cooling pipe structure for arc furnaces. A plurality of cooling pipes are embedded in the refractory and are supported by a pair of support pipes. The support pipes recirculate coolant back and forth between the support pipes through the cooling pipes.

U.S. Pat. Nos. 4,424,756 and 4,475,470 to Merkel teach a suspended roof for an industrial furnace. Each hanger supports a pair of carrier bricks. Each carrier brick in turn supports two filler bricks so that a single embedded hanger supports six bricks: two carrier bricks and four filler bricks. The hangers are hung from telescoping tubes which may be retracted to remove successive groups of bricks. The tubes are hung by rods or wires from an overhead cross beam to support the entire roof structural.

U.S. Pat. No. 4,704,155 to Matesa et al. teaches a refractory block lid construction for a heating vessel. Each block is independently supported by a pair of water cooled pipes fitted within grooves along opposing vertical side walls of the block.

SUMMARY OF THE INVENTION

The present invention teaches a refractory clad lid for a heating vessel having a refractory block section removably mounted from a water cooled metal panel. The face of each section is exposed to highly corrosive conditions within the heating vessel. The lower surface of each panel has a dovetailed joint configuration and each refractory block section has a complimenting dovetailed configuration such that each block section may be slid into position along the lower surface of the lid panel for maintenance and/or replacement. In addition, each panel is independently supported relative to the heating vessel so that each panel is individually removably from the entire structure without having to remove the entire structure. The present invention provides an insulating construction that reduces amount of heat lost from the heating operation so as to improve the thermal efficiency while maximizing the operating life of the vessel by providing a refractory facing backed by a cooled metal support panel at exposed surfaces within the vessel.

DETAIL DESCRIPTION OF THE INVENTION

This invention is used in a process wherein a hostile environment deteriorates exposed surfaces of a container and is particularly well suited for use in a heating process where high temperatures, in addition to other adverse conditions within a heating vessel such as circulation of corrosive and abrasive materials, significantly reduces the useful life of the exposed side walls and lid of a heating vessel. The invention is presented in connection with glass batch liquefaction process equipment, similar to that taught in U.S. Pat. No. 4,668,272 to Newcamp et al., whose teaches are hereby incorporated by reference, but as will be appreciated, the invention can be used in any process in which an unprotected, exposed structure is employed.

Figure 1:
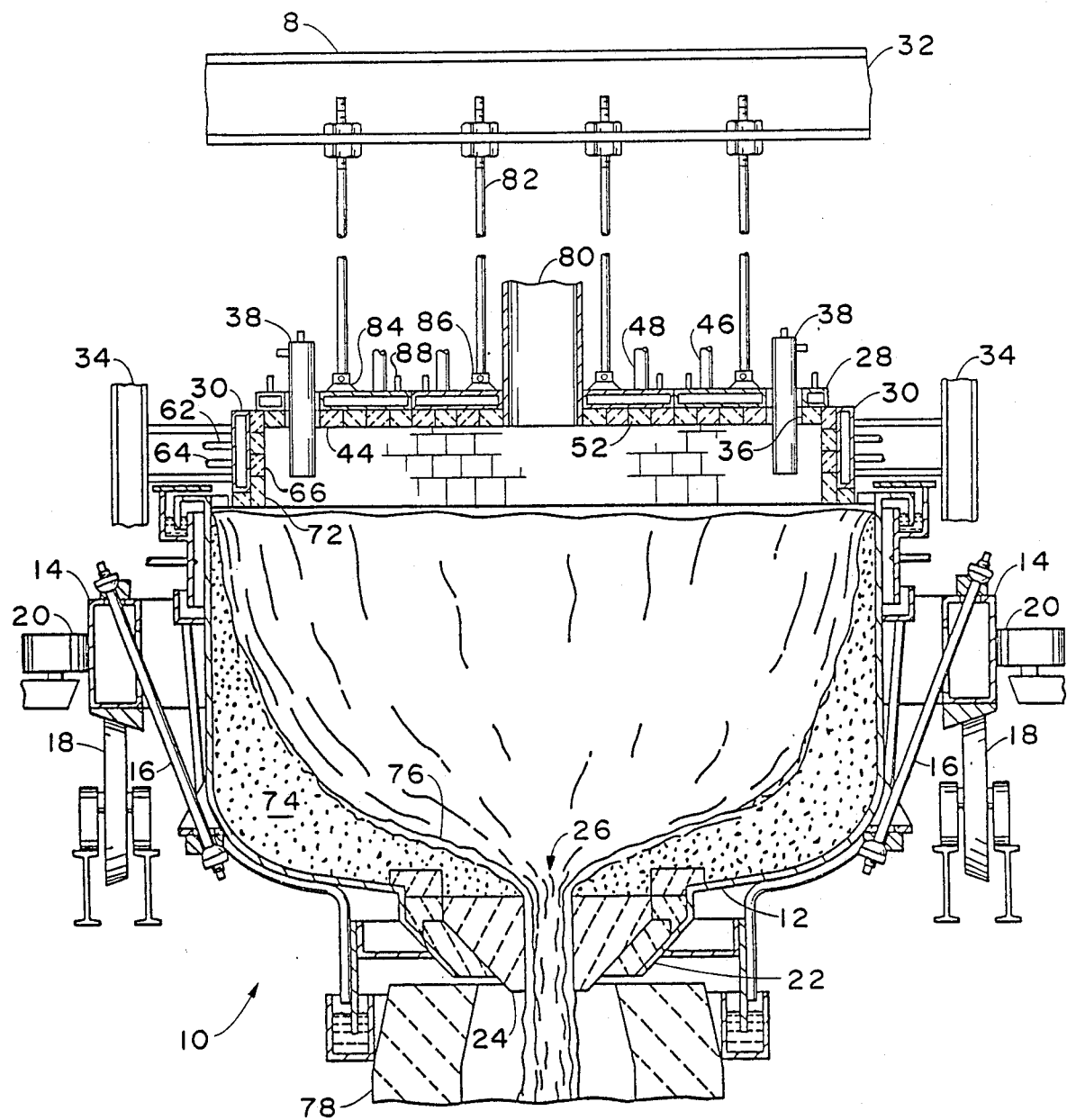
FIG. 1 is a cross-section of the heating vessel incorporating features of the present invention.

FIG. 1 illustrates a liquefaction vessel 10 similar to that disclosed in U.S. Pat. No. 4,668,272 and includes a steel drum 12 suspended from a circular frame 14 by struts 16. The drum 12 is mounted on a plurality of support rollers 18 and aligning rollers 20 for rotation about a generally vertical axis corresponding to the centerline of the drum 12. An outlet 22 below the drum 12 includes a bushing 24 with an opened center 26. Lid 28 and sidewalls 30, which are the subject of the present invention, are provided with stationary support frames 32 and 34, respectively, which are mounted independent from the rotating drum 12 as shown in FIG. 1. The lid 28 includes one or more openings 36 for inserting a high temperature burner 38 into the vessel 10.

Figure 2:
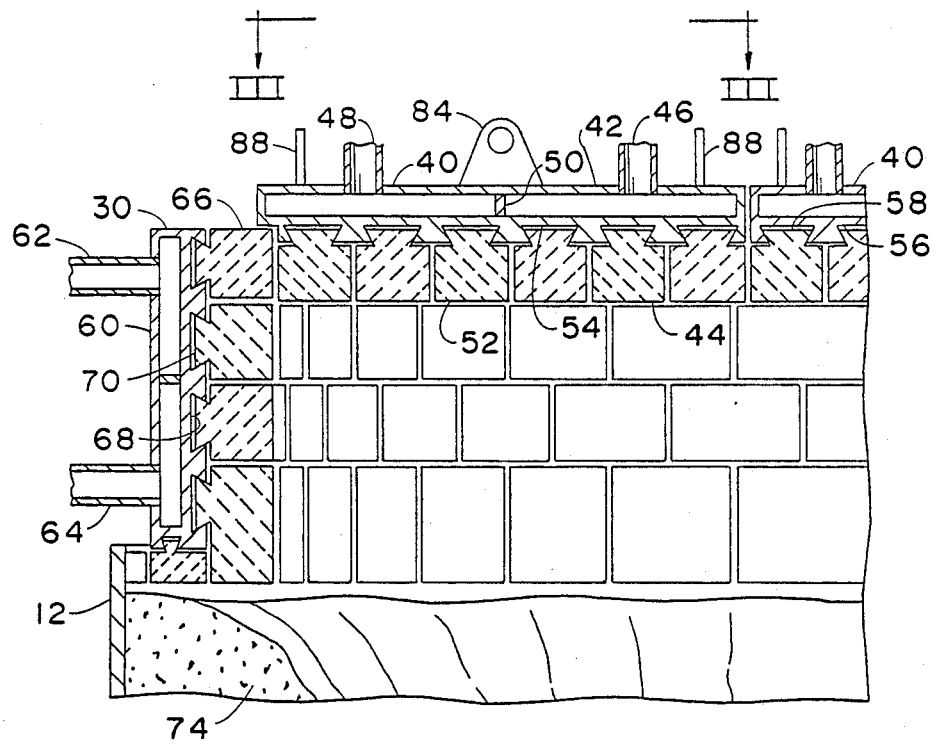
FIG. 2 is an enlarged cross-section of the heating vessel shown in FIG. 1 showing a portion of the vessel lid and side wall.
Figure 3:
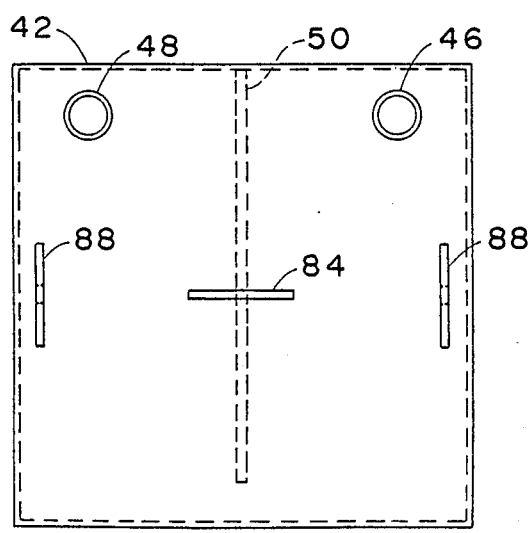
FIG. 3 is a top view of the roof panel taken along line 3—3 in FIG. 2.
Figure 4:
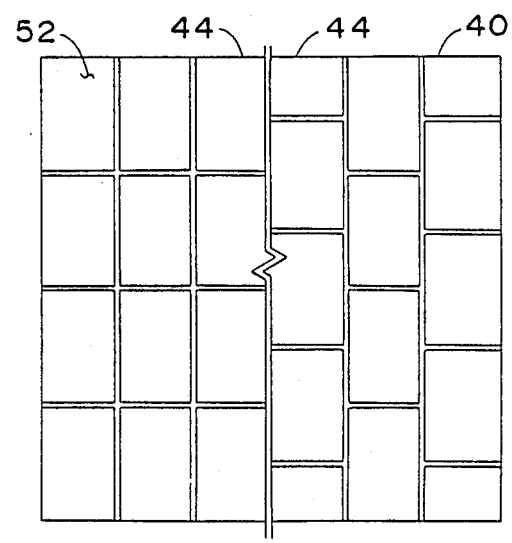
FIG. 4 is a bottom view of a typical rectangular panel showing the arrangement of the refractory block.

Referring to FIGS. 2 through 4, the lid 28 includes a plurality of roof sections 40 having a hollow metal panel 42 and a refractory facing 44. The panels 42 include an inlet 46 through which coolant is delivered to the panel and an outlet 48. Although not limiting in the present invention, the coolant is preferably water. Baffle plate 50 helps direct and distribute the coolant through the panel 42. Refractory facing 44 includes a plurality of refractory blocks 52 secured to the lower face 54 of the panel 42. Although not limiting in the present invention, in the particular embodiment illustrated in FIG. 2, the interface between the panel 42 and blocks 52 includes an interlocking joint arrangement. More particularly, lower face 54 of the panel 42 is provided with a dovetailed groove 56 which generally matches a dovetailed projection 58 in the refractory block 52. The dovetailed type arrangement allows blocks 52 to be replaced in the panel 42 without having to replace the entire refractory facing 44.

The blocks 52 of the panel 42 may be aligned in rows or staggered as shown in the left and right sides, respectively, of FIG. 4. A small amount of clearance is provided around the perimeter of each block to allow for thermal expansion. In addition, a small amount of clearance is provided within the dovetailed connection between the panel 42 and blocks 52, as shown in FIG. 2, to allow for thermal expansion at the interlocking joint.

Referring to FIGS. 1 and 2, sidewall 30 is constructed in a manner similar to the that discussed earlier for lid 28. In particular, metal panels 60 which are supported from frame 34 (shown in FIG. 1 only) include coolant inlets 62 and outlets 64 to cool the sidewall 30. A plurality of refractory blocks 66 are attached to the face 68 of panel 60 by means of a series of interlocking dovetailed joints 70 to form a refractory facing 72.

Within the vessel 10, a stable layer of unmelted batch 74 is maintained on the walls of the drum 12 encircling the central cavity within which combustion and melting takes place as shown in FIG. 1. The heat from the burners 38 causes the surface portion 76 of the batch to become liquefied and flow downward toward and through the bottom opening 26. The liquefied batch then flows out of the liquefaction vessel 10 and may be collected in a vessel 78 below the liquefaction vessel for further processing as needed. Exhaust gases escape either upwardly through an opening in the lid 28 and into an exhaust duct 80 or downwardly through the opening 26 of the bushing 24.

During the melting process the temperature along the refractory facings 44 and 72 reaches upwards of 2600° F. (1427° C.) and higher and various materials may become entrained in the hot exhaust gas circulating within the vessel 10. For example, in a typical soda-lime-silica glass batch, corrosive vapors, such as but not limited to sodium oxide, and particulates such as, but not limited to, sodium sulfate or sodium carbonate, combine with the hot exhaust gas to form a corrosive and abrasive gas stream that will corrode any exposed surface within the vessel 10, and in particular to the exposed surfaces of the lid 28 and sidewall 30.

In the present invention, the blocks are 52 and 66 are sized such that the temperature along the hot facing 44 of the lid 28 and hot facing 72 of the sidewall 30 is depressed just enough to increase the refractory life to acceptable level without excessive process energy loss. Due to the exponential rate at which refractory wear increases with temperature, it is possible to greatly extend refractory life with a refractory hot face temperature reduction of as little as 150° F. (66° C.) from 2600° F. (1427° C.) to 2450° F. (1343° C.). This cooling is affected by circulating coolant through the lid panels 42 and sidewall panels 60 via the inlet and outlets. Specifically referring to the lid 28, each panel 42 includes a coolant inlet 46 and outlet 48, as discussed earlier, so that the temperature of the individual roof section 40 may be adjusted, if required. In addition, since each panel 42 has an inlet and outlet, a single roof section 40 may be removed from the lid 28 as will be discussed later without affecting the coolant circulation in any other section 40 of the lid 28.

Similarly, coolant is circulated through panel 60 of sidewall 30 to reduce the face temperature of refractory blocks 66 so as to prolong their operating life and reduce maintenance. It should be appreciated that the sidewall 30 may include a plurality of panel sections that are removably mounted from frame 34, or a single panel encircling the outer periphery of the lid 28.

Under operating conditions, the blocks 52 and 66 will have a thermal gradient through their thickness due to the high temperatures along the exposed, hot face and the cooling along its opposite, cold face. As the hot face expands due to the high temperature, it will pull on the cold face and place it in tension. The amount of internal stress within the block resulting from this condition is a function of the thermal gradient, block thickness and lateral block dimensions. With respect to the lateral dimensions of the blocks, if the blocks are large, the expansion along the hot face will produce excessive tensile stresses along the cold face and cause the block to break up into smaller pieces in an uncontrolled manner. By reducing the block size, the stresses along the cold face are lowered and block breakage is reduced. With regard to block thickness, as block thickness increases, heat loss from the vessel decreases due to the block's addition insulating affects, and the temperature within the vessel increases. This condition accelerates block wear. Conversely, if the block thickness is reduced, there is greater heat loss from the vessel and the vessel temperature is lowered. Although not limiting in the present invention, and based on various tested block configurations, in a glass melting vessel 10 as disclosed in the present application wherein the temperature within the vessel along the exposed surfaces reach temperatures of 2600° F. (1427° C.), the blocks are preferably 4 inch (10.2 cm) cubic refractory blocks made of a fused cast alpha/beta alumina such as that available from Sohio Engineered Material, New York, sold under the trademark Monofrax M. The surfaces 44 and 72 of the blocks 52 and 66, respectively, are cooled to maintain of hot face temperature of approximately 2400° F. This combination of block configuration and material provides a good compromise between maintaining the structural integrity of the block, minimizing block wear, and reducing thermal loss during operation.

It is anticipated that materials entrained within the circulating hot exhaust gas within the vessel 10 may adhere to the exposed facings 44 and 72 in a manner similar to that taught in U.S. Ser. No. 068,375 to Kunkle et al. filed June 28, 1987, which teachings are hereby incorporated by reference. The builtup layer (not shown) would provide additional protection to the exposed facings 44 and 72 of blocks 52 and 66, respectively, and reduce cooling requirements since the builtup layer would operate as an additional heat insulating layer.

In the preferred embodiment of the invention, each individual roof section 40 is supported such that it may be removed without affecting the operation of the remaining sections 40. In the particular embodiment of the invention illustrated in FIGS. 1, 2 and 3, the roof sections 40 are supported from beam 81 (shown only in FIG. 1) of support frame 32 via tie rod 82 and hanger 84. Clevis 86 of tie rod 82 is pinned to hanger 84 while the upper end of rod 82 is removably secured to beam 80. Positioning plates 88 similar in construction to hanger 84, may be provided for handling the roof section 40 as it is moved into and out of position in the lid 28 by a lifting mechanism, for example an overhead crane (not shown). The crane supports the section 40 via positioning plates 88 as the rod 82 is disconnected and the inlet 46 and outlet 48 are uncoupled from a coolant supply (not shown). The crane then lifts the roof section 40 out from the lid 28, transfers it to an unloading site, and returns to the opening in the lid 28 with a new section 40. As an alternative, the sections 40 may be lifted directly by the tie rod 82.

It should be appreciated that although the embodiments of the invention illustrated in FIGS. 1 through 4 show a flat lid with generally rectangular removable roof sections 40, other lid and/or roof section configurations may be used. For example, the lid 28 may be domed with the refractory blocks 66 positioned along a curved lower surface 54 of panel 42. Furthermore, the refractory block itself may be contoured to provide a desired surface configuration.

In addition, the lid design of the present invention may be combined with other lid or roof configurations wherein only selected portions of the roof require continued monitoring and replacement due to temperature and/or corrosive and/or abrasive conditions within the heating vessel.

The present invention provides increased flexibility in the design of the lid and side walls. Normal refractory construction in a glass melting furnace consists of a complex compression arch and the attendant need for heavy bucking steel. This invention allows the use of a matrix of individual refractory clad panels to form a lid or other exposed surface. There is no need to rely on an arch structure. Each panel is individually supported so that the lid may be maintained and portions replaced without removing the entire lid assembly. Furthermore, the refractory block is positioned on the individual sections 40 by the dovetailed joint arrangement which allows the refractory block to slide into place along the lower face 54 of the panel 42.

The forms of this invention shown and described in the disclosure represent illustrative preferred embodiments and is understood that various changes may be made without the parting from the scope of the present invention as defined by the claims that follow.

I claim:

1. A protective panel for a heating vessel comprising:
   a hollow support member having an engagable surface;
   a plurality of refractory blocks having an engagable surface, wherein said engagable surfaces of said support member and blocks include grooves and projections interlocking with said grooves so as to maintain said refractory blocks along said member in generally abutting relationship to form a refractory facing;
   means for mounting said support member to position said refractory facing toward the inside of said heating vessel; and
   means to circulate cooling fluid through said support member to cool said refractory facing and prevent deterioration of said blocks from a hostile environment within said vessel.

2. The panel as in claim 1 wherein said groove has a dovetailed configuration.

3. The panel as in claim 1 wherein said refractory block is fused cast alpha/beta alumina.

4. The panel as in claim 1 wherein said panel is at least part of a lid for said heating vessel.

* * * * *